Oct. 16, 1945.  H. Q. HERRSTROM  2,387,069
HARVESTER REEL
Filed Dec. 31, 1943   2 Sheets-Sheet 1
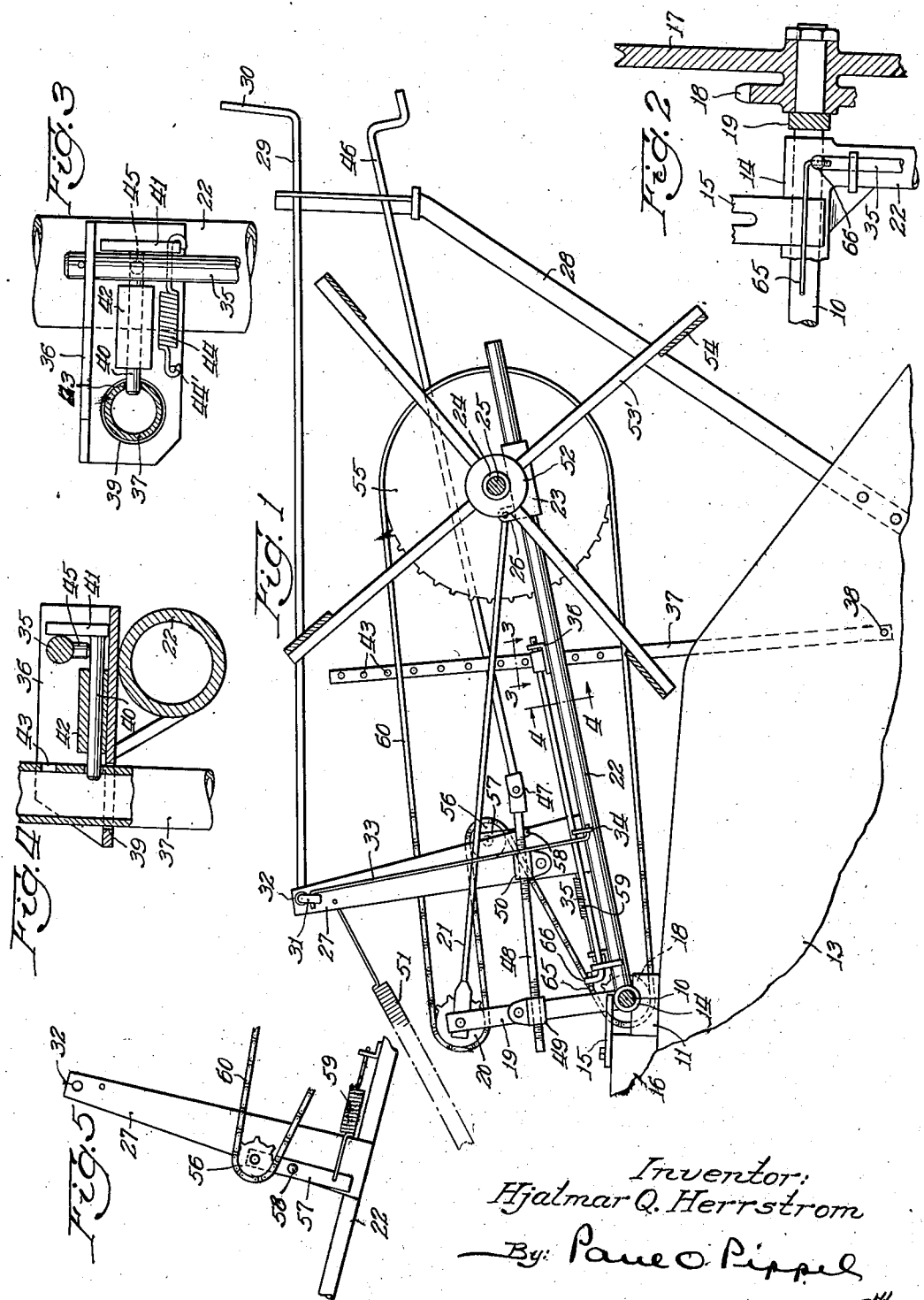
Inventor:
Hjalmar Q. Herrstrom
By: Paul O Pippel
Atty.

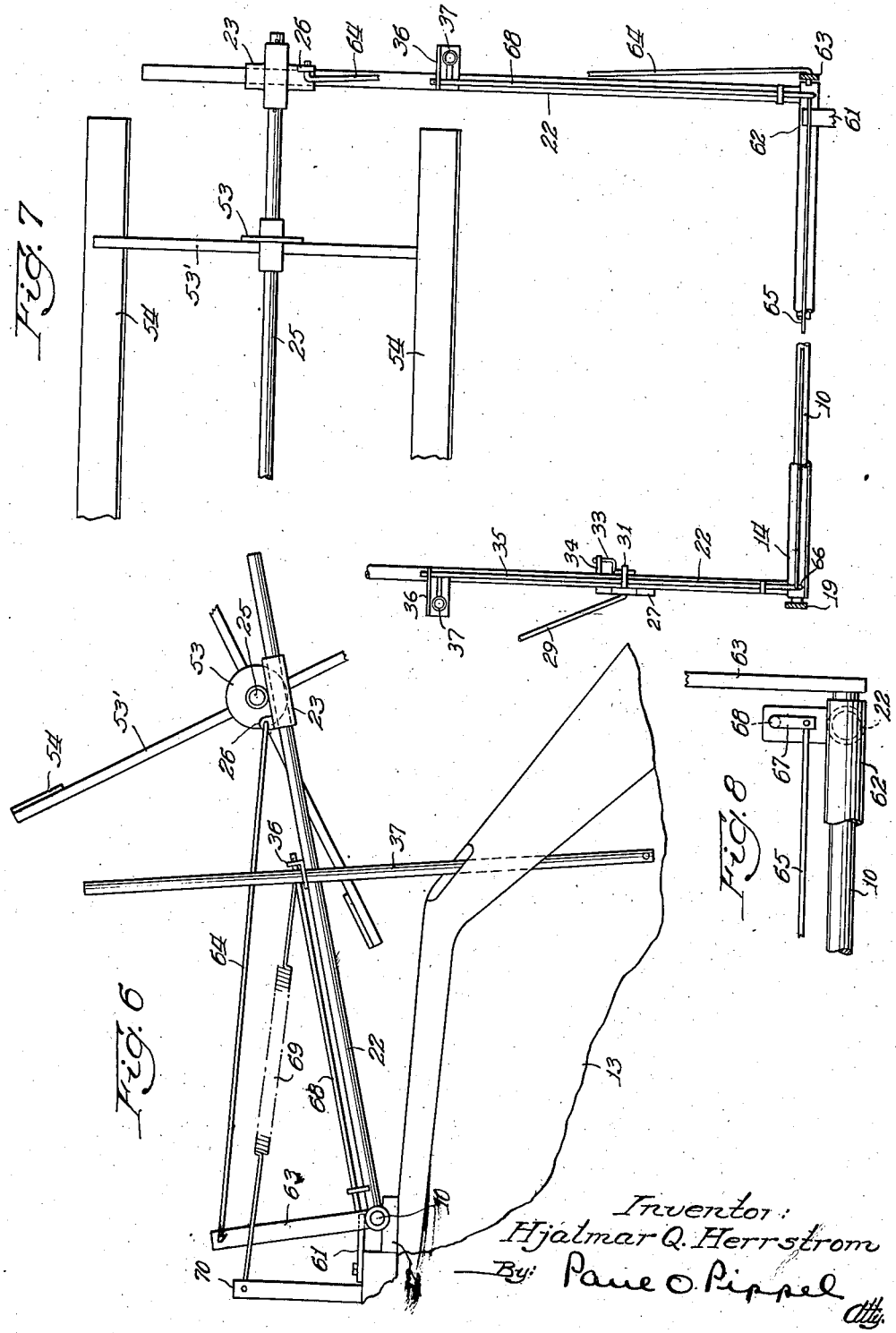

Patented Oct. 16, 1945

2,387,069

UNITED STATES PATENT OFFICE 2,387,069

HARVESTER REEL

Hjalmar Q. Herrstrom, Rock Island, Ill., assignor to International Harvester Company, a corporation of New Jersey Application December 31, 1943, Serial No. 516,403

15 Claims. (Cl. 56—222)

This invention relates to a reel construction for harvesting machines. More specifically, it relates to an adjusting mechanism for altering the working position of a reel. In the use of harvesting machines, when the standing grain is cut a reel is almost always used for assuring that the grain falls forwardly over the platform from which it is conveyed to a threshing cylinder or to other mechanism for further treatment or for being deposited in windrows on the ground. Due to the different height of grain and the different operating conditions, it is usually necessary with harvesting machines to frequently adjust the height of the platform and the position of the reel with respect to the platform, both in vertical direction and in a fore and aft direction. Various devices have been used for obtaining these adjustments.

The principal object of the present invention is to provide remote control adjusting means for altering the vertical position of a reel with respect to its supporting structure and for altering the fore and aft position.

Another object is to accomplish the adjustments above defined from a remote position and without affecting the continuity of the driving means for the reel.

A more specific object is to provide a locking means for the vertical adjustment which can be readily released prior to adjustment by the same means which accomplishes the adjustment.

The above objects and others which will be apparent from the detailed description to follow, are accomplished by a construction such as shown in the drawings, in which—

Figure 1 is an elevation showing the supporting and adjusting structure at one end of a reel;

Figure 2 is a detail of the mounting structure and the drive elements at one end of the reel structure;

Figure 3 is an enlarged section taken on the line 3—3 of Figure 1;

Figure 4 is a section taken on the line 4—4 of Figure 1;

Figure 5 is a detail of the opposite side of the bracket member shown in Figure 1;

Figure 6 is an end elevation of the reel structure taken at the other end relative to the structure shown in Figure 1;

Figure 7 is a partial plan view with sufficient elements shown to indicate the entire arrangement of the reel structure;

Figure 8 is an elevation of the connecting end of the transverse and forwardly extending elements shown in Figure 7.

As reel structures are well known in the art of harvesting machines, only such parts of the frame structure of a harvesting machine have been illustrated as are necessary to indicate a mounting means for a reel structure.

A transverse shaft 10 is mounted for oscillation on a supporting block 11 at one end, as shown in Figure 1, and a similar block 12 at the other end, as shown in Figure 6. Said blocks are carried by the harvester frame structure, the end sheets 13 of which are shown in Figures 1 and 6. As shown in Figures 1 and 2, the shaft 10 extends at one end through a sleeve 14 which rests directly on the supporting block 11, being held in position by a member 15 removably secured to a part 16 on the harvester structure. The shaft 10 extends beyond the sleeve 14 to provide a support for a V-belt drive pulley 17 and a chain drive sprocket 18.

An upwardly extending lever arm 19 is rigidly secured to the shaft 10 adjacent the sprocket 18. At its upper end said lever arm carries a chain sprocket 20 and provides a pivot point for an adjusting member in the form of a link 21.

As best shown in Figure 2, a reel supporting bar in the form of a pipe 22 is rigidly secured to the sleeve 14 extending at right angles thereto. A bearing member 23, slidably mounted on said pipe, provides a journal in the form of a sleeve 24 for a reel shaft 25. An upstanding apertured end 26 on the bearing member 23 provides a point of connection for the link 21.

An upstanding bracket member 27 is rigidly secured to the pipe 22 spaced from its connection with the sleeve 14. An adjusting member support 28 rigidly secured to one of the sheets 13 provides a support for an angularly movable adjusting member 29. Said member has a handle portion 30 adapted to be engaged by an operator adjacent its support on the supporting member 28. At its other end said member has a right-angled end portion 31 extending loosely through an opening 32 formed in the upper end of the bracket member 27. A rod 33, hooked into an opening formed in the end portion 31, is hooked at its lower end into a lever 34 secured to a rod 35 lying parallel to the pipe 22. As best shown in Figures 3 and 4, the rod 35 extends at one end through an opening provided in a bracket 36 rigidly secured to the pipe 22 and extending outwardly therefrom. A reel supporting and locking member in the form of a pipe 37, pivotally secured to the end sheet 13 at 38, extends upwardly through an opening 39 formed in the bracket 36. It will be noted that said bracket is formed of a right-angled section with one portion lying on the pipe 22 and the other portion extending at right angles thereto. The opening 39 is formed in the horizontal portion and the rod 35 extends through an opening formed in the vertical portion of the bracket. A latch member including a plunger 40 and a plate 41 is slidably mounted on the horizontal portion of the bracket 36, being held thereon for reciprocating movement by a housing member 42. The plunger 40 is adapted to engage any one of a plurality of openings 43 formed in the locking member 37. A spring 44 secured to the plate 41 and to a pin 44' on the bracket 36 urges the latch into locking position. A depending projection 45 on the rod 35 provides means for disengaging the plunger when the rod 35 is oscillated by the rod 33 and the adjusting member 29, previously described.

A second adjusting member 46 is carried by the support 28 and connected by a universal-joint assembly 47 with a threaded element 48. Said element is provided with right and left hand threads at the opposite ends on which internally threaded members 49 and 50 are mounted. Said members are secured, respectively, to the lever 19 and the bracket 27. Due to the opposition action of the threads at the ends of the element 48, it will be understood that rotation of the adjusting member 46 will alter the relative angular positions of the lever arm 19 and the bracket 27. A counterbalance spring 51 is connected to the bracket 27 to substantially bear the weight of the reel structure so that when the latch plunger 40 is disengaged the operator may readily lift or lower the reel structure.

The shaft 25 carries a hub structure 52 at one end and 53 at the other end from which arms 53' radiate for supporting the reel slats 54. The shaft 25 also carries at one end a large chain sprocket 55 for driving the reel.

As illustrated in Figure 5, an idler chain sprocket 56 is carried by a member 57 pivoted at 58 on the bracket 27. A tension spring 59 connected to the member 57 acts to maintain a predetermined tension on the drive chain. A drive chain 60 passes over the upper sprocket 20 directly to the sprocket 55 and therefrom directly around the drive sprocket 18. The chain then passes inwardly around the idler sprocket 56 and back to the sprocket 20. As the sprocket 56 is carried by the bracket 27 and as the sprocket 20 is carried by the lever 19, there will be some differential in chain length during adjustment of the lever at 19 relative to the bracket 27. For that reason, the resiliently supported sprocket 56 has been provided to take care of the adjustment and to maintain the desired chain tension.

The plan view of Figure 7 shows the shaft 10, the sleeve 14, and the parallel forwardly extending pipes 22 at both ends in order to tie the construction together and illustrate the complete arrangement. The shaft 10 and the sleeve 14 extend across the machine where they are supported on a second block 10, being held therein by a member 61 which is identical with the member 15. An end portion 62 on the sleeve 14 is rigidly connected to the second forwardly extending pipe 22. Said pipe and the reel supporting member 23, slidably carried thereon, are exactly the same in construction as the parts previously described at the other end of the platform. An upstanding lever arm 63, similar to the lever arm 19, provides a point of pivotal connection for a link 64 which is pivotally connected to the ear 26 on the bearing member 23. A transversely extending rod 65 pivotally connected to an upturned end 66 of the rod 35 is pivotally connected to a down-turned arm 67 on a second rod 68. Said rod 68 extends to a latch device exactly the same in construction and bearing the same reference characters as the last device at the other end of the platform. Said last device is carried by the bar 22 and cooperates with a second pipe 37 identical in construction and function with the pipe 37 described.

To balance the reel structure above described, a tension spring 69 is connected to a portion of the latch device and to an upstanding member 70 carried by the harvester structure.

In the operation of a harvesting machine embodying the reel construction above described, the adjusting members 29 and 46 are positioned where they may be easily reached by an operator. When it is desired to change the vertical position of the reel, the operator grasps the handle 30 on the adjusting member 29, turning said handle a sufficient distance to disengage the latch means. This action takes place through the rod 33 and the rods 35 and 68, said rods being connected for operation in opposite angular directions by means of the transverse rod 65. The pipes 22 are then unlocked with respect to the vertical pipes 37, the entire reel structure being free for pivoting about the shaft 10. The springs 51 and 69 counterbalance the structure at both ends to the extent that the operator may lift or lower the reel with very little force. The pivoting for adjustment occurs when the operator pushes or pulls on the member 29 to shift it axially. By using balanced springs and locking means at each end, there is very little torsion applied to the sleeve 14 which assures maintaining the reel in horizontal position and preventing any substantial cocking action which would interfere with its free operation. As the drive chain 60 operates from the sprocket 18 concentric with the shaft 10, vertical adjustment of the reel has no effect on the drive mechanism.

When the operator finds it desirable to move the reel in a fore and aft position, it is necessary only to rotate the adjusting member 46 in the proper direction, thereby changing the relative angular position of the lever arms 19 and 63 with respect to the reel-supporting pipes 22. Force is then transmitted through the rods 21 and 64 to the bearing members 23 which are moved axially along the pipes 22 carrying the reel therewith. As the drive sprocket 55 on the reel shaft moves in the same direction as the sprocket 20 on the lever arm 19, there is a certain correction brought about in the chain length during adjusting. As it is not possible to completely correct for the variation in the chain length, the idler sprocket 56 is provided on a resilient mounting bracket so that a limited amount of take-up is provided without materially altering the tension of the chain and its effective operation.

It is to be understood that applicant has shown and described only a preferred embodiment of his improved reel construction and adjusting mechanism therefor, and that he claims as his invention all modifications falling within the scope of the appended claims.

What is claimed is:

1. A reel construction and adjusting mechanism therefor, comprising a frame structure, a transverse shaft rotatably mounted on said frame structure, upwardly-extending lever arms at the ends of said shaft secured thereto for oscillation therewith, a pair of longitudinal and forwardly-extending supporting bars journaled on said shaft adjacent the lever arms for oscillation with respect to the shaft, reel-supporting members slidably mounted on said bars, a reel carried by said supporting members, and adjusting members pivotally secured to the upstanding lever arms and to the reel-supporting members whereby oscillation of said levers moves the reel longitudinally of the supporting bars.

2. A reel construction and adjusting mechanism therefor, comprising a frame structure, a transverse shaft rotatably mounted on said frame structure, upwardly-extending lever arms at the ends of said shaft secured thereto for oscillation therewith, a pair of longitudinal and forwardly-extending supporting bars journaled on said shaft adjacent the lever arms for oscillation with respect to the shaft, reel-supporting members slidably mounted on said bars, a reel carried by said supporting members, adjusting members pivotally secured to the upstanding lever arms and to the reel-supporting members whereby oscillation of said levers moves the reel longitudinally of the supporting arms, and a bracket member secured to one of the supporting bars, means being provided for adjusting the bracket member relative to the corresponding lever arm.

3. A reel construction and adjusting mechanism therefor, comprising a frame structure, a transverse shaft rotatably mounted on said frame structure, upwardly-extending lever arms at the ends of said shaft secured thereto for oscillation therewith, a pair of longitudinal and forwardly-extending supporting bars journaled on said shaft adjacent the lever arms for oscillation with respect to the shaft, reel-supporting members slidably mounted on said bars, a reel carried by said supporting members, adjusting members pivotally secured to the upstanding lever arms and to the reel-supporting members whereby oscillation of said levers moves the reel longitudinally of the supporting bars, and means for adjustably supporting the forwardly-extending bars for adjusting the vertical position of the reel.

4. A reel construction and adjusting mechanism therefor, comprising a frame structure, a transverse shaft rotatably mounted on said frame structure, upwardly-extending lever arms at the ends of said shaft secured thereto for oscillation therewith, a pair of longitudinal and forwardly-extending supporting bars journaled on said shaft adjacent the lever arms for oscillation with respect to the shaft, reel-supporting members slidably mounted on said bars, a reel carried by said supporting members, adjusting members pivotally secured to the upstanding lever arms and to the reel-supporting members whereby oscillation of said levers moves the reel longitudinally of the supporting bars, means for adjusting the bracket member relative to the corresponding lever arm, and means for adjustably supporting the forwardly-extending bars for adjusting the vertical position of the reel.

5. A reel construction and adjusting mechanism therefor, comprising a frame structure, a transverse shaft rotatably mounted on said frame structure, upwardly-extending lever arms at the ends of said shaft secured thereto for oscillation therewith, a sleeve journaled on said shaft, a pair of longitudinal forwardly-extending supporting members fixed on said sleeve adjacent the lever arms for oscillation with respect to the shaft, bearing members slidably mounted at the outer ends of said members for reciprocation with respect thereto in a fore and aft direction, said bearing members having transversely alined journal portions, a reel shaft rotatably mounted in said journal portions, a reel carried by said shaft, and adjusting members pivotally secured to the upstanding lever arms adjacent their upper ends and to the bearing members whereby oscillation of said levers moves the bearing members and the reel longitudinally of the supporting members.

6. A reel construction and adjusting mechanism therefor, comprising a frame structure, a transverse shaft rotatably mounted on said frame structure, upwardly-extending lever arms at the ends of said shaft secured thereto for oscillation therewith, a sleeve journaled on said shaft, a pair of longitudinal forwardly-extending supporting members secured to said sleeve adjacent the lever arms for oscillation with respect to the shaft, bearing members slidably mounted at the outer ends of said members for reciprocation with respect thereto in a fore and aft direction, said bearing members having transversely alined journal portions, a reel shaft rotatably mounted in said journal portions, a reel carried by said shaft, adjusting members pivotally secured to the upstanding lever arms adjacent their upper ends and to the bearing members whereby oscillation of said levers moves the bearing members and the reel longitudinally of the supporting members, an upstanding bracket member on one of the supporting members, and means for adjusting said bracket member relative to the corresponding lever arm.

7. A reel construction and adjusting mechanism therefor, comprising a frame structure, a transverse shaft rotatably mounted on said frame structure, upwardly-extending lever arms at the ends of said shaft secured thereto for oscillation therewith, a pair of longitudinal forwardly-extending supporting members journaled on said shaft adjacent the lever arms for oscillation with respect to the shaft, bearing members slidably mounted at the outer ends of said members for reciprocation with respect thereto in a fore and aft direction, said bearing members having transversely alined journal portions, a reel shaft rotatably mounted in said journal portions, a reel carried by said shaft, adjusting members pivotally secured to the upstanding lever arms adjacent their upper ends and to the bearing members whereby oscillation of said levers moves the bearing members and the reel longitudinally of the supporting members, and means for adjustably supporting the forwardly-extending supporting members for adjusting the vertical position of the reel.

8. A reel construction and adjusting mechanism therefor, comprising a frame structure, a transverse shaft rotatably mounted on said frame structure, upwardly-extending lever arms at the ends of said shaft secured thereto for oscillation therewith, a sleeve journaled on said shaft, a pair of longitudinal forwardly-extending supporting members secured to said sleeve adjacent the lever arms for oscillation with respect to the shaft, bearing members slidably mounted at the outer ends of said members for reciprocation with respect thereto in a fore and aft direction, said bearing members having transversely alined journal portions, a reel shaft rotatably mounted in said journal portions, a reel carried by said shaft, adjusting members pivotally secured to the upstanding lever arms adjacent their upper ends and to the bearing members whereby oscillation of said levers moves the bearing members and the reel longitudinally of the supporting members, a bracket mounted on one of the supporting members; means for adjusting the bracket member relative to the corresponding lever arm, and means for adjustably supporting the forwardly-extending supporting members for adjusting the vertical position of the reel.

9. A reel construction and adjusting mechanism therefor, comprising a frame structure, a transverse shaft rotatably mounted on said frame structure, upwardly-extending lever arms at the ends of said shaft secured thereto for oscillation therewith, a sleeve journaled on said shaft, a pair of longitudinal forwardly-extending supporting members secured to said sleeve adjacent the lever arms for oscillation with respect to the shaft, bearing members slidably mounted at the outer ends of said members for reciprocation with respect thereto in a fore and aft direction, said bearing members having transversely alined journal portions, a reel shaft rotatably mounted in said journal portions and held against endwise movement with respect thereto, a reel carried by said shaft, a drive sprocket mounted on said shaft, and adjusting members pivotally secured to the upstanding lever arms adjacent their upper ends and to the bearing members whereby oscillation of said levers moves the bearing members and the reel longitudinally of the supporting members, a bracket member secured to one of the supporting members spaced from the lever arm and extending upwardly, a threaded adjusting element, oppositely threaded members on said element at each end thereof, said members being secured respectively to the lever arm at one end and to the extending upstanding bracket member, an adjusting member support extending upwardly from the crop-gathering device, and an adjusting element extending from said support to the threaded element for rotating said element.

10. A reel construction and adjusting mechanism therefor comprising a frame structure, a transverse shaft mounted on said frame structure, a pair of forwardly-extending supporting members journaled on said shaft, a reel carried by said supporting members, locking members connected to the crop-gathering device and extending upwardly adjacent the reel-supporting members, said locking members having a plurality of notches therein, latch devices carried by the reel-supporting members for engaging said notches, means for connecting said latches for simultaneous operation, and an adjusting member operable to disengage said latches and to shift the vertical position of the reel while the latches are disengaged.

11. A reel construction and adjusting mechanism therfor comprising a frame structure, a transverse shaft mounted on said frame structure, sleeve journaled on said shaft, a pair of forwardly-extending supporting members secured to said sleeve, a reel carried by said supporting members, a bracket member secured to one of the supporting members spaced from the lever arm and extending upwardly, locking members connected to the crop-gathering device and extending upwardly adjacent the reel-supporting members, said locking members having a plurality of notches therein, latch devices carried by the reel-supporting members for engaging said notches, means for connecting said latches for simultaneous operation, and an adjusting member carried by said bracket member operable to disengage said latches and to shift the vertical position of the reel while the latches are disengaged.

12. A reel construction and adjusting mechanism therefor comprising a frame structure, a transverse shaft rotatably mounted on said frame structure, a reel structure including a pair of forwardly-extending supporting members journaled on said shaft and a reel carried thereby, springs connected to the crop-gathering device and to said reel structure for counterbalancing the same, locking members connected to the crop-gathering device and extending upwardly adjacent the reel-supporting members, said locking members having a plurality of notches therein, latch devices carried by the reel-supporting members for engaging said notches, means for connecting said latches for simultaneous operation, and an adjusting member operable to disengage said latches and to shift the vertical position of the reel while the latches are disengaged.

13. A reel construction and adjusting mechanism therefor, comprising a frame structure, a transverse shaft rotatably mounted on said frame structure, upwardly-extending lever arms at the ends of said shaft secured thereto for oscillation therewith, a sleeve journaled on said shaft, a pair of longitudinal forwardly-extending supporting members secured to the sleeve adjacent the lever arms for oscillation with respect to the shaft, bearing members slidably mounted at the outer ends of said members for reciprocation with respect thereto in a fore and aft direction, said bearing members having transversely alined journal portions, a reel shaft rotatably mounted in said journal portions and held against endwise movement with respect thereto, a reel carried by said shaft, adjusting members pivotally secured to the upstanding lever arms adjacent their upper end and to the bearing members whereby oscillation of said levers moves the bearing members longitudinally of the supporting members, a bracket member secured to one of the supporting members spaced from the lever arm and extending upwardly, a threaded adjusting element, oppositely threaded members on said element at each end thereof, said members being secured respectively to the lever arm at one end and to the extending upstanding bracket member, an adjusting member support extending upwardly from the crop-gathering device, an adjusting element extending from said support to the threaded element for rotating said element, a second adjusting element extending from said support to the upper end of the bracket, locking members connected to the crop-gathering device and extending upwardly adjacent the reel-supporting members, said locking members having a plurality of notches therein, latch devices carried by the reel-supporting members for engaging said notches, means for connecting said latches for simultaneous operation, and an actuating mechanism operable by the second adjusting element to engage and disengage said latches.

14. A reel construction and adjusting mechanism therefor, comprising a frame structure, a transverse shaft rotatably mounted on said frame structure, upwardly-extending lever arms at the ends of said shaft secured thereto for oscillation therewith, a sleeve journaled on said shaft, a pair of longitudinal forwardly-extending supporting members secured to the sleeve adjacent the lever arms for oscillation with respect to the shaft, bearing members slidably mounted at the outer ends of said members for reciprocation with respect thereto in a fore and aft direction, said bearing members having transversely alined journal portions, a reel shaft rotatably mounted in said journal portions and held against endwise movement with respect thereto, a reel carried by said shaft, a drive sprocket mounted on said shaft, adjusting members pivotally secured to the upstanding lever arms adjacent their upper end and to the bearing members whereby oscillation of said levers moves the bearing members longitudinally of the supporting members, a bracket member secured to one of the supporting members spaced from the lever arm and extending upwardly, an adjusting member support extending upwardly from the crop-gathering device, an adjusting element extending from said support to the upper end of the bracket, locking members connected to the crop-gathering device and extending upwardly adjacent the reel-supporting members, said locking members having a plurality of notches therein, latch devices carried by reel-supporting members for engaging said notches, means for connecting said notches for simultaneous operation, and an actuating mechanism operable by the adjusting element to engage and disengage said latches.

15. A reel construction and adjusting mechanism therefor, comprising a frame structure, a transverse shaft rotatably mounted on said frame structure, upwardly-extending lever arms at the ends of said shaft secured thereto for oscillation therewith, a sleeve journaled on said shaft, a pair of longitudinal forwardly-extending supporting members mounted on said sleeve adjacent the lever arms for oscillation with respect to the shaft, bearing members slidably mounted at the outer ends of said members for reciprocation with respect thereto in a fore and aft direction, said bearing members having transversely alined journal portions, a reel shaft rotatably mounted in said journal portions and held against endwise movement with respect thereto, a reel carried by said shaft, a drive sprocket mounted on said shaft, adjusting members pivotally secured to the upstanding lever arms adjacent their upper end and to the bearing members whereby oscillation of said levers moves the bearing members longitudinally of the supporting members, a bracket member secured to one of the supporting members spaced from the lever arm and extending upwardly, a threaded adjusting element, oppositely threaded members on said element at each end thereof, said members being secured respectively to the lever arm at one end and to the extending upstanding bracket member, an adjusting member support extending upwardly from the crop-gathering device, an adjusting element extending from said support to the threaded element for rotating said element, a second adjusting element extending from said support to the upper end of the bracket, locking members connected to the crop-gathering device and extending upwardly adjacent the reel-supporting members, said locking members having a plurality of notches therein, latch devices carried by reel-supporting members for engaging said notches, means for connecting said latches for simultaneous operation, an actuating mechanism operable by the second adjusting element to engage and disengage said latch, tension spring means connected to the upwardly-extending bracket member for balancing the reel structure, a drive sprocket rotatably mounted on the extending end of the transverse shaft, a sprocket rotatably mounted at the upper end of the lower arm, a take-up sprocket resiliently mounted on the reel structure and a driving chain extending around said sprockets.

HJALMAR Q. HERRSTROM.